United States Patent
Bray

[11] 3,756,615
[45] Sept. 4, 1973

[54] SNOW SKIS FOR VEHICLE WHEELS
[76] Inventor: Richard L. Bray, Box 946, Lago Vista, Tex. 78641
[22] Filed: July 19, 1971
[21] Appl. No.: 163,771

[52] U.S. Cl. .................................................. 280/14
[51] Int. Cl. .......................................... B62b 19/04
[58] Field of Search ................... 280/13, 14, 8, 28; 180/5 R

[56] References Cited
UNITED STATES PATENTS
2,093,229  9/1937  Bowman ............................. 280/8
3,593,814  7/1971  Bawler ............................... 280/28
1,346,052  7/1920  Ollivier .............................. 280/14

Primary Examiner—Benjamin Hersh
Assistant Examiner—Robert R. Song
Attorney—Clarence A. O'Brien and Harvey B. Jacobson

[57] ABSTRACT

Replacement means for front vehicle wheels, more particularly, ski-type runners. No modification of the vehicle, other than removing the wheels and substituting the skis or runners, is necessitated. The customary nut-equipped studs or lugs permit ready and reliable conversion. Each runner is provided midway between leading and trailing ends with a balanced adapter embodying a ring-like head or collar which has bolt holes for the studs, said head being united with the upper end of a shank or standard whose lower end is equipped with a base which is joined to the runner. A side-slip preventing rib is provided with dry land rollers for convenient transporting purposes.

3 Claims, 4 Drawing Figures

PATENTED SEP 4 1973 3,756,615

Richard L. Bray
INVENTOR.

BY Clarence A. O'Brien
and Harvey B. Jacobson
Attorneys

SNOW SKIS FOR VEHICLE WHEELS

This invention relates to expeditiously and temporarily converting a dry land motor vehicle to an adaptation which then lends itself to feasible and reliably safe use on snow and ice covered surfaces such as are adapted for sledding and skiing.

More particularly, the concept has to do with equipping the usual drive wheels at the rear of the vehicle with anti-skid chains or suitably lugged tires, removing the demountable steerable front wheels and replacing the same with interchangeable skis, that is, skis whose median or intermediate portions are provided with rigid upstanding adapters which lend themselves to practical and reliable use on the nut-equipped studs or lugs after the aforementioned wheels have been removed and set aside.

Reference to the prior art to which the instant invention relates will show that the idea of replacing vehicle wheels with runners or skis and transforming the overall vehicle from a land type to a sledding or skiing type is old and well known. As indicative generally stated, of the state of the art to which the present invention relates, the reader may find the runner carrier for motor vehicles in a U.S. Pat. No. 1,346,052, issued to Jocelyn E. Ollivier to be informative. Also and for further backgrund purposes, but not particularly pertinent, is the ski attachment for wheeled vehicles disclosed in U.S. Pat. No. 2,598,628 granted to Cash E. Giovannoni.

Not all motor vehicles would be regarded as suitable for conversion purposes and, under the circumstances, it will be evident that the one herein shown and which is uniquely adaptable has to do with a so-called "dune buggy" or a similar type vehicle, it being understood that the essence of the invention has to do not necessarily with the type of vehicle but rather with a novel and improved ski-type runner which makes the conversion feasible and practical and which is an innovation in that it requires no modification of the brake drums on which the adapters can be successfully and reliably mounted and clamped.

Briefly one aspect of the invention has to do with a motor vehicle chassis having forward and rearward ends, a steerable body structure with is operatively mounted atop and cooperatively fastened and oriented with the frame and which embodies, as usual, appropriate self-contained prime mover means. The rear axle supported drive wheels if equipped with snow tires can be used without alteration. On the other hand, it is preferred that the tires be either provided with anit-skid chains or that the wheels be replaced with appropriate heavy lugged tires. The usual front wheels which are bolted to the customary brake drums are removed and replaced by the improved ski-like runners. As is evident from the single runner shown, it is proportional in size with that portion of the chassis frame with which it is supportively cooperable. It has upturned leading and trailing ends. In addition the central portion is provided with the aforementioned adapter means, more specifically, an adapter comprising a ring-like head or collar which can be bolted on the brake drum, the collar having a depending shank or standard which is anchored on a median portion of the runner.

Novelty is also predicated on providing the runner with a slot which extends lengthwise and also providing the underneath side with a depending side-slip minimizing rib. This rib, in turn, is provided with longitudinally spaced free-turning rollers, that is, rollers which come into play when the vehicle has to be temporarily moved over a dry road or land surface or parked in a garage or the like, as the case may be.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
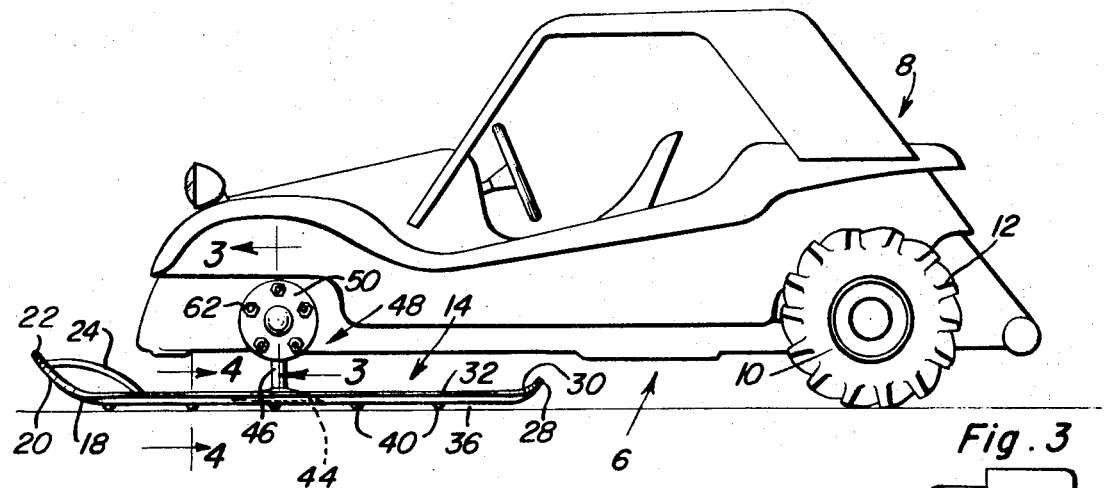
FIG. 1 is a view in side elevation of an appropriately styled motor vehicle wherein the rear drive wheels are replaced by appropriate anti-skid wheels and wherein the front wheels (not shown) have been removed, the side illustrated being provided with the replacement ski-like runner constructed in accordance with the principles of the present invention.
Figure 4:
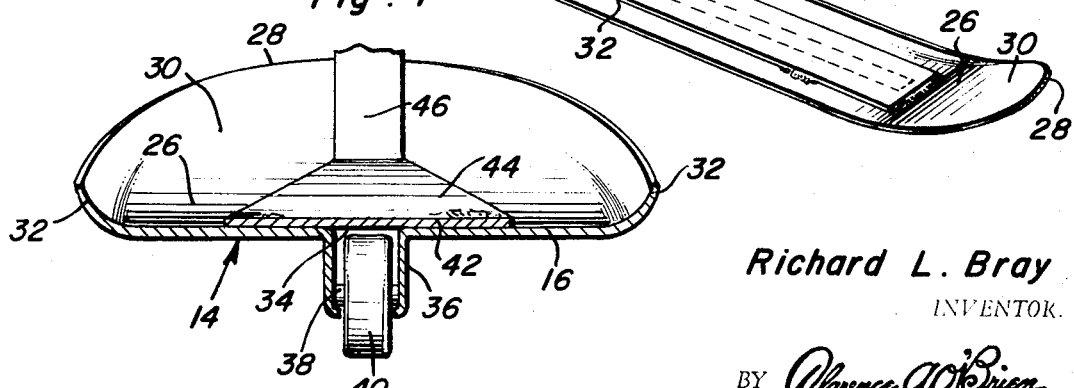

And FIG. 4 is a similarly enlarged transverse cross-section taken approximately on the plane of the vertical line 4—4 of FIG. 1 and also showing in section and elevation the component parts which are seen from this point of view.

Figure 3:
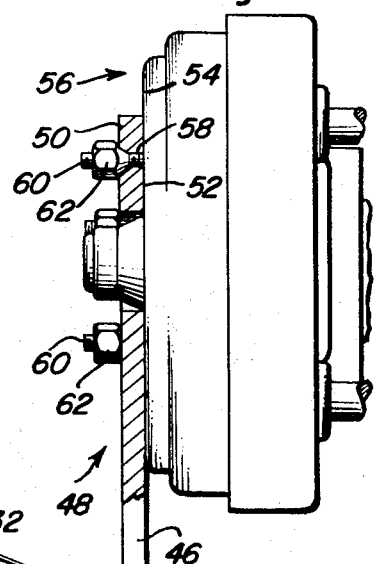
FIG. 3 is an enlarged view with parts in section and elevation taken approximately on the plane of the vertical section line 3—3 of FIG. 1 looking in the direction of the indicating arrows.
Figure 2:
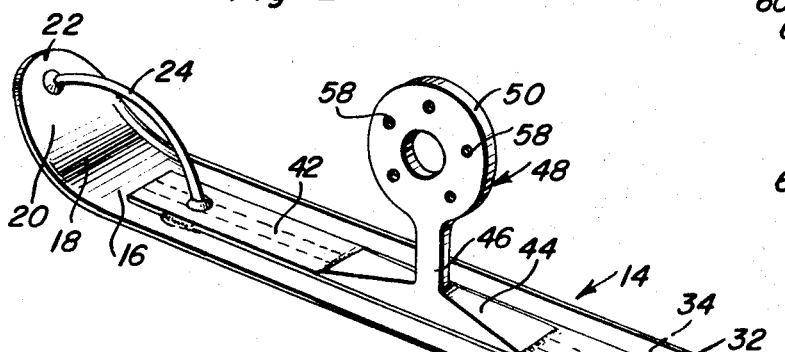
FIG. 2 is an enlarged view in perspective showing one runner and the details of construction thereof.

With reference in particular to FIG. 1 the aforementioned chassis frame of the overall motor vehicle is denoted by the numeral 6. The occupant accommodating motor-equipped body, which is supported atop the frame is denoted by the numeral 8. As already implied the drive wheels can be the customary wheels provided with snow treads. On the other hand these wheels may constitute replacement wheels, one of which is shown at 10 and is equipped with appropriate anti-skid lugs 12. FIG. 1 also shows the front wheels (not illustrated) removed. It will be understood that for purposes of simplification and instead of showing a pair of like ski-type runners, a single ski or runner is shown. Under the circumstances the broad expression "runner means" covers either paired runners (not hown) or a single runner such as is shown in FIGS. 1, 2 and 3. The overall self-contained ski or runner is denoted by the numeral 14 and it is proportional in size, that is lengthwise and crosswise, to that part of the vehicle with which it is cooperatively associated in actual use. It will also be understood that the runner or ski is made of appropriate material. The main body portion 16 (FIGS. 2 and 4) is appropriately elongated and has substantially flat top and bottom sides. The forward or leading end is bent as at 18 and is upturned or properly toed in as at 20 and the terminal edge is rounded as at 22. An arcuate stabilizing brace is suitably positioned and anchored in place and is denoted at 24. The rearward end of the ski or runner is similarly bent as at 26, has a rounded terminal edge portion 28 and provides an upturned trailing end portion 30. The body portion is also slightly dished along the lengthwise edges. This is to say the respective longitudinal edge portions are bent up and are of concave-convex form to provide appropriate flanges 32.

The median lengthwise body portion is provided with a longitudinal slot 34 below which a channel-shaped side-slip minimizing rib 36 (FIG. 4) is provided. The side walls of the channel serve to accommodate journals 38 on the hub portions of land traction rollers or wheels 40. Half portions of the rollers are arranged in the hollow portion of the channel and the other half portions project below the slotted web of the channel. By providing the slotted web and longitudinally spaced free idling rollers 40 the runer or ski lends itself to rollable use on dry land surfaces.

The slot 34 is covered by an elongated cover plate 42. This plate is of requisite width and is welded atop the body portion of the ski and provides the desired rigidifying result. In addition the median portion of this cover plate serves to accommodate a foot-like base 44 at the bottom of a shank or standard 46 constituting component parts of a novel adapter 48. This adapter is unique in that the upper ring-like head 50 has flat surfaces one of which is denoted in FIG. 3 at 52. This surface is positioned flatwise against the substantially flat surface 54 of the brake durm 56. This head or collar is also provided with equidistant circumferentially spaced bolt holes 58 which serve to accommodate the usual screw-threaded lugs or studs 60 which project outwardly from the face 54 of the brake drum 56 (FIG. 3). Stated otherwise, these bolt holes are fitted over the outstanding studs after which the assembling and retaining nuts 62 (regularly used nuts) are replaced.

It is reiterated that a single sledding ski or runner 14 is shown and that is practice these runners are used in pairs. In fact they are intended to replace the front wheels after the front wheels have been unbolted and removed. Once the wheels are off the adapter heads or rings 50 are positioned against the brake drums in the manner suggested in FIG. 3. WIth the head in place and with the studs 60 extending through and beyond the bolt holes 58 the nuts 62 are applied and tightened and consequently this novel adapter means 48 serves to apply and retain the runner.

The novel ski or runner is designed so as to require no modification of the existing or component parts of the vehicle inasmuch as it utilizes the existing shock absorbing and steering means. In actual practice the brake shoes (not shown) should be adjusted out in order to keep the brake drums from turning freely. It can be added too that to improve traction the drive wheels should be fitted with snow chains or lugged tires as already suggested. The small free-turning roller-like wheels 40 are carried by the non-side-slip rib and function to permit the vehicle to be moved across dry surfaces, for example, in and out of a garage or across cleared roads or land.

While the invention was specifically designed for use on a so-called "dune buggy", it can, of course, be easily adapted to function in conjunction with similarly constructed motor vehicles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For conversion use on and in conjunction with nut-equipped wheel mounting studs on a brake drum on a wheel supported motor vehicle, a readily applicable and removable ski comprising an elongated runner having top and bottom sides and upturned forward and rearward terminal ends, adapter means through the medium of which said runner can be operatively joined to said studs, said adapter means comprising a rigid shank joined at a lower end to a median top side portion of said runner and provided on its upper end with a rigid ring-like flat-faced head, one face of said head being adapted to coordinate face-to-face with an exterior surface of said brake drum and having circumferentially spaced bolt holes for passage and retention of said studs, said head being of a prescribed thickness that said studs can project outwardly through and beyond said holes to accommodate the usual wheel hub assembling and retaining nuts, the median lengthwise portion of said runner being formed with a longitudinal slot and directly below said slot with an aligned depending side-slip minimizing rib, said rib being channel-shaped in cross-section and being provided with a plurality of longitudinally spaced, cooperatively aligned free-turning ground contacting rollers which serve primarily to effectually traverse highway and road surfaces when the vehicle is being temporarily transported on land, moved in or out of a garage, or parked in a driveway or elsewhere, said slot being covered by a cover plate fixed atop the top side of said runner, said shank having a lower end provided with an enlarged mound like anchoring base, said base being fixedly mounted atop a coacting median portion of said cover plate.

2. For conversion use on and in conjunction with outstanding circumferentially spaced nut-equipped wheel mounting studs on a wheel supported motor vehicle brake drum, a readily applicable and removable self-contained ski comprising: an elongated ski-type runner having elongated top and bottom sides and upwardly curved leading and trailing terminal ends, and rigid adapter means associatively cooperable with a median portion of said top side and through the medium of which said runner can be attached to and operatively joined with said drum and the studs thereon, said adapter means comprising a rigid vertical shank having a lower end fixed to a median top side portion of said runner and provided on its upper end with a rigid ring-like flat-faced head, said head being of an outside diameter corresponding to the diameter of said drum, one face of said head being adapted to coordinate and contact face-to-face with an existing exterior surface of said brake drum and having circumferentially spaced stud holes for alignment with and passage and retention of the respectively oriented studs, said head being of a prescribed thickness that the usual outer threaded ends of said studs can and do project outwardly through and beyond said holes in a manner to accommodate and permit attachment and maintenance of the usual wheel hub assembling and retaining nuts, the median lengthwise portion of the bottom side of said runner being formed with an upwardly opening longitudinal slot and directly below said slot with an aligned depending side-slip minimizing rib, said rib being of a length commensurate with the length of the body portion of said runner and channel-shaped in cross-section and being provided with a plurality of longitudinally spaced, rotatably mounted free-turning ground contacting rollers which serve to effectually traverse highway and road surfaces when the vehicle is being temporarily transported on land, is being moved in or out of a garage, or parked in a driveway or elsewhere when not skiing.

3. The ski defined in and according to claim 2, and wherein said head is located in a position midway between the terminal portions of the leading and trailing ends of said runner and has flat vertical faces situated midway between the longitudinal inner and outer marginal edges of said runner.

* * * * *